Oct. 22, 1963     L. F. JONES     3,108,246
DETECTION OF METALLIC OBJECTS ON AN OCEAN FLOOR
Filed Dec. 28, 1956     2 Sheets-Sheet 1

LOUIS FRANKLIN JONES
INVENTOR

BY George Sipkin
Rolla N. Carter
ATTORNEYS

Oct. 22, 1963 L. F. JONES 3,108,246
DETECTION OF METALLIC OBJECTS ON AN OCEAN FLOOR
Filed Dec. 28, 1956 2 Sheets-Sheet 2

LOUIS FRANKLIN JONES
INVENTOR.

BY George Sipkin
Zella N. Carter
ATTORNEYS

Patented Oct. 22, 1963

3,108,246
DETECTION OF METALLIC OBJECTS ON AN OCEAN FLOOR
Louis Franklin Jones, Panama City, Fla., assignor to the United States of America as represented by the Secretary of the Navy
Filed Dec. 28, 1956, Ser. No. 631,379
5 Claims. (Cl. 340—4)
(Granted under Title 35, U.S. Code (1952), sec. 266)

The invention described herein may be manufactured and used by or for the Government of the United States of America for governmental purposes without the payment of any royalties thereon or therefor.

The present invention relates to the detection of metallic objects and more particularly to the detection of such objects on an ocean floor by means of a probe member having bare electrodes which by contacting such objects vary the characteristics of an electric circuit.

In accordance with a principal feature of the invention a probe or electrode is provided with a serrated edge which is adapted in sliding over a metallic object being sought to generate a pulsating current which can be amplified and measured using alternating current techniques.

An object of the invention is to provide a simple apparatus of robust construction for detecting metallic objects on the ocean floor.

Another object of the invention is to provide detection apparatus which generates an electric signal having an alternating current component.

The invention itself will be understood from the following description when read in connection with the accompanying drawing, and its scope will be pointed out in the appended claims.

Figure 1:
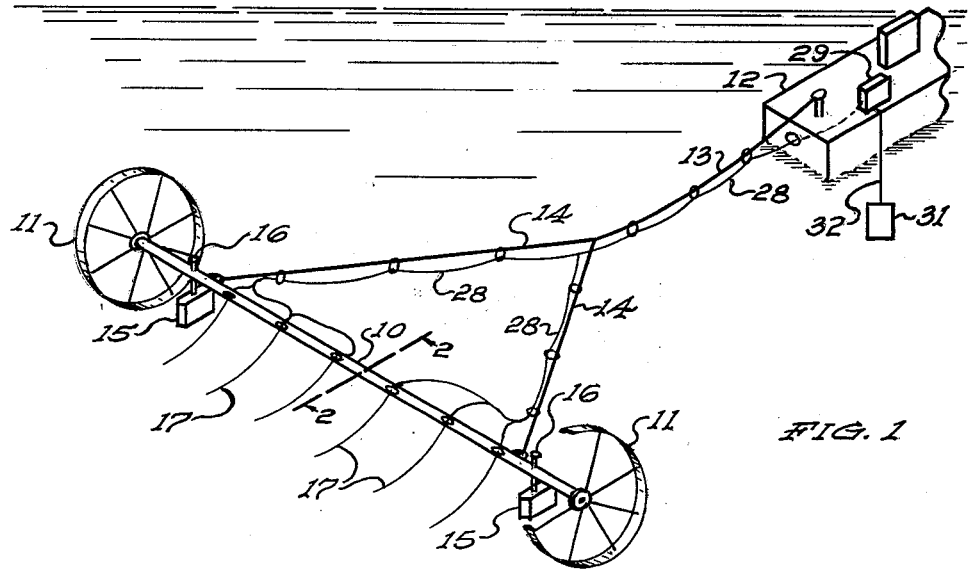
FIG. 1 is a view in perspective of a complete system incorporating the invention.

The apparatus to be described for the purpose of disclosing the invention has been designed to detect, locate, or otherwise sense, only those metallic objects, of which anti-ship mines are exemplary, which lie proud on the ocean floor. This purpose is accomplished by providing in any suitable manner for the probe or probes to be drawn along over the bottom and out of contact therewith by a few inches, say of the order of one quarter the diameter of the objects being hunted. This is permissible because with the exception of soft muddy bottoms it takes considerable time for a mine to bury itself and is desirable because a probe or electrode in dragging along the bottom generates a "scraping" E.M.F. which at best produces an undesirable background signal. It is to be understood however, that thanks to the fact that the probes of the present invention develop a signal having an alternating current component of fixed frequency (for any given speed) a considerable portion of such background frequency can be filtered out.

The apparatus to be described in detail for detecting metallic objects has been designed for detecting ferrometallic objects. If desired or found to be necessary to search for nonferrous metallic objects, the laws pertaining to voltaic couples or other galvanic devices are known so that anyone skilled in the art can readily design a suitable system for use in sea water as the electrolyte.

There are a number of systems available for towing instruments through a body of water at a fixed distance above the bottom and the apparatus of the invention is functionally indifferent to the particular system employed. As here shown a vehicle having an elongated axletree 10 provided at its ends with wheels 11 rotatably mounted thereon is adapted to be towed by a vessel 12 through a tow line 13 and a suitable bridle 14. In order to provide the vehicle with the desired negative buoyancy for causing it to ride on the seabottom, weights 15 may be secured to the axletree 10 in any suitable manner as by bolts 16 which support the weights 15 in depending relation to resist any tendency the axletree 10 might have to rotate.

Figures 2, 3:
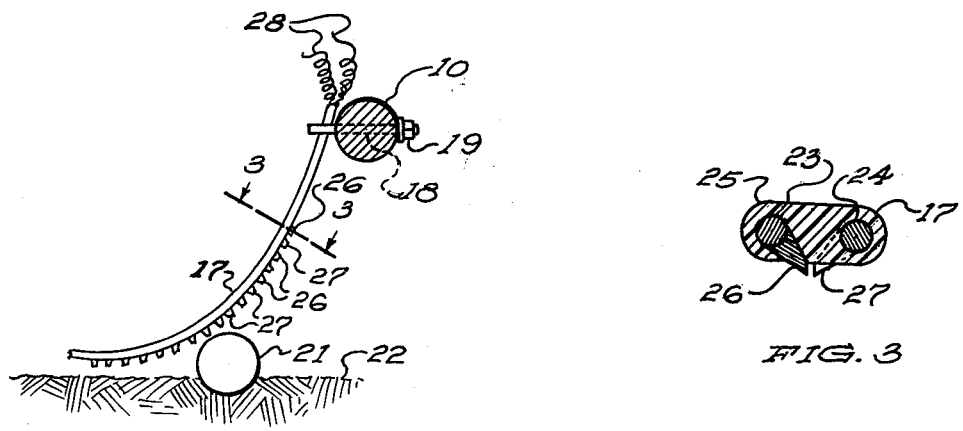
FIG. 2 is a section on line 2 of FIG. 1.
FIG. 3 is a section on line 3 of FIG. 2.

The axletree 10 may be constructed of any suitably strong material but a non-metallic material such as wood or plastic is preferred. A plurality of prongs 17 are secured to the axletree 10 in spaced relation along its length by suitable means such as eyebolts 18 extending through the axletree 10, the prongs 17 being inserted in the looped heads of the eyebolts 18 and being adapted to be drawn up snugly against the axletree 10 by nuts 19 on the threaded ends of the eyebolts 18, all as best seen in FIGURE 2. The prongs 17 which in assembly resemble the prongs of a rake are preferably reversely curved to present a convex edge in the direction of tow so as to insure a relatively long as well as effective sliding contact with a sought object 21 on an ocean floor 22.

Each of the prongs 17 as shown in FIGURE 3 is made up of two core members 23 and 24 of electrically conducting material embedded in a body 25 of insulating material preferably by being molded therein and having protuberances or teeth 26 and 27, respectively, protruding slightly beyond the leading edge of the prong 17 so as to present bare metal teeth spaced along said leading edge. It will be evident that this arrangement results in the successive teeth 26 and 27 being electrically connected alternately to the core members 23 and 24.

The teeth 26 and 27, which preferably are stainless steel, and their associated core members 23 and 24 are connected through insulated cables 28 to suitable instrumentation 29 aboard the towing vessel 12. For reasons which will be evident from the description of FIGURE 4, the instrumentation 29 is also connected to an electrode 31 immersed in the ocean as through a lead 32.

Figure 4:
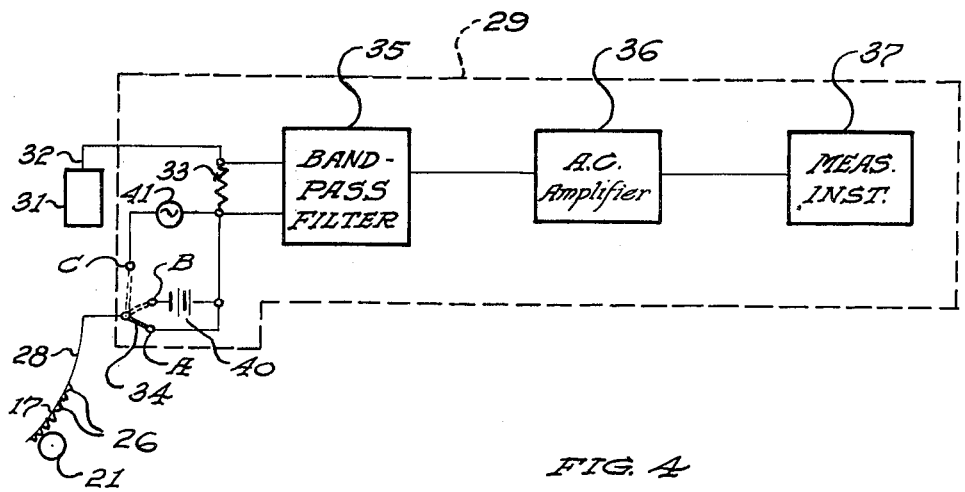
FIG. 4 is a schematic diagram of the detecting circuit.

FIGURE 4 illustrates one suitable form which the instrumentation 29 for one set of teeth may take as comprising a load resistance 33 connected in series with the electrode 31, the lead 32, a switch 34, the cable 28, and the prong 17, the circuit of a voltaic couple being completed through the body of sea water common to the electrode 31, and one set of teeth on the prong 17. With the switch 34 in position A, when the toothed prong 17 slides over a ferrometallic object 21 and the electrode 31 is of a suitable metal such as copper a varying current will flow through the resistance 33. The voltage drop across this resistance 33 is passed through a band pass filter 35 to an alternating current amplifier 36 and thence to a suitable measuring instrument 37.

By moving the switch 34 to contact B a direct current source 40 is connected in series with the load resistor 33 and the cable 28 to impress an electromotive force across the prong 17 and the electrode 31. With this circuit arrangement when the prong 17 slides over an object 21 of conducting material the effective area of a tooth 26 in contact with the object 21 is greatly increased and the resistance of the circuit is greatly reduced to bring about an increase in current flowing through the load resistance 33. As the alternate teeth 26 successively make and break contact with the object 21 the alternating current component is fed to the amplifier 36 through the band pass filter 35, which filters out the direct current component.

By moving the switch 34 to contact C an alternating current source 41 is connected in series with the load resistance 33 and the cable 28 to impress a suitable carrier frequency, e.g. ten kilocycles, across the prong 17 and the electrode 31. With this circuit arrangement the carrier frequency will be modulated as the teeth 26 make momentary contact with the object 21 in succession. The band pass filter 35 passes the modulating frequency to the amplifier 36 and thence to the measuring instrument 37 while removing the carrier frequency.

It will be understood that the band pass filter is designed or chosen for the frequency expected to be derived from the prong 17 which as pointed out above depends upon the spacing of the teeth 26 and the speed the device is towed along the bottom. In each of the three modes of operation described above, the band pass filter improves the signal-to-noise ratio and especially so if the prongs happen to scrape along the bottom due to maladjustment or to undulations in the sea bottom.

It will be evident from the above description that the present invention provides an apparatus with which contact with a metallic object on a sea bottom produces fluctuations in an electric current of a frequency which can be predetermined for any speed so that a signal of this frequency indicates the presence of a metallic object.

It should also be noted that the dentate prong serves the dual functions of modulating the current flow and of breaking through any poorly conducting surface coating which may be present on the metallic object.

It will be understood that at least one set of teeth on each prong 17 will be connected to instrumentation as described above and that the provision of such instrumentation for the alternate sets of teeth is optional and would ordinarily be so provided only when its monitoring function is especially desired.

It will be appreciated that the measuring instrument 37 in FIGURE 4 may be indicating and/or recording in nature and that the interval of time a contact signal persists is a direct function of the dimension in the direction of tow of the object being contacted and the speed of tow so that some classification as to object size can be made by a skilled operator.

While for the purpose of describing the invention a preferred embodiment thereof has been described in detail, it will be obvious to those skilled in this art that many modifications may be made incorporating the principle of the present invention without departing from the spirit and scope of the appended claims.

What is claimed is:

1. Apparatus for detecting a metallic object on an ocean floor comprising a voltaic couple system including an electrode immersed in the ocean, an elongated probe having a plurality of exposed teeth spaced along its length, an insulated conductor connecting the electrode and said probe, and means for detecting electric currents flowing in the conductor, a frame including a transverse support adapted to be towed a short distance above the ocean floor, and means securing said probe to the transverse support with its exposed teeth facing the direction of tow, said probe extending downwardly and rearwardly with its trailing end approximately at the ocean floor.

2. Apparatus for detecting the presence of ferrometallic objects on the ocean floor comprising an axletree adapted to be towed laterally through the ocean a few feet above and parallel to the ocean floor, a plurality of prongs secured to and depending from the axletree, each of the prongs being curved to present a convex face in the direction of tow, a plurality of teeth spaced along the convex face of each prong, an insulated electrical conductor connected to alternate teeth in each prong and to an electrode comprised of a material which forms with ferrometals a voltaic couple in sea water, and means for detecting electrical currents flowing in said conductor.

3. The apparatus described in claim 2 wherein the teeth intermediate said alternate teeth are connected through a second insulated electrical conductor to a second electrode, and separate means are provided for detecting electrical currents flowing in said second conductor.

4. Apparatus for detecting the presence of metallic objects in the ocean including an electric circuit, and a probe member for varying the current flowing in said circuit when it contacts a metallic object, said probe member comprising a plurality of bare metal teeth for breaking through poorly conductive surface coatings on objects being detected, and an insulated electrical conductor connected in said circuit and to alternate ones of said teeth, whereby electrical contact with said conductor is repeatedly made and broken when the probe member is dragged over a metallic object.

5. The apparatus described in claim 4 including an alternating current amplifier, a bandpass filter, means for feeding the alternating current component of the current in said cricuit through the bandpass filter to said amplifier, and means for measuring the output of said amplifier.

References Cited in the file of this patent

UNITED STATES PATENTS

| | | |
|---|---|---|
| 521,609 | Blake | Sept. 25, 1894 |
| 1,287,907 | Delany | Dec. 17, 1918 |
| 2,320,986 | Redmond | June 1, 1943 |